US008239674B2

(12) United States Patent
Lee et al.

(10) Patent No.: US 8,239,674 B2
(45) Date of Patent: Aug. 7, 2012

(54) SYSTEM AND METHOD OF PROTECTING FILES FROM UNAUTHORIZED MODIFICATION OR DELETION

(75) Inventors: Charles Lee, Ladera Ranch, CA (US); David N. Hall, Jr., Rancho Santa Margarita, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 1195 days.

(21) Appl. No.: 11/821,165

(22) Filed: Jun. 22, 2007

(65) Prior Publication Data

US 2008/0120727 A1 May 22, 2008

Related U.S. Application Data

(60) Provisional application No. 60/860,578, filed on Nov. 21, 2006.

(51) Int. Cl.
*G06F 21/00* (2006.01)

(52) U.S. Cl. ............. 713/165; 713/167; 726/26; 726/27

(58) Field of Classification Search .......... 713/165–167; 726/26–30
See application file for complete search history.

(56) References Cited

U.S. PATENT DOCUMENTS

| | | | |
|---|---|---|---|
| 6,321,094 B1 | 11/2001 | Hayashi et al. | |
| 6,433,685 B1 | 8/2002 | Struble et al. | |
| 6,510,325 B1 | 1/2003 | Mack, II et al. | |
| 6,971,018 B1* | 11/2005 | Witt et al. | 713/187 |
| 7,032,089 B1* | 4/2006 | Ranade et al. | 711/161 |
| 7,047,257 B2* | 5/2006 | Fletcher et al. | 1/1 |
| 2001/0018738 A1 | 8/2001 | Mori et al. | |
| 2003/0172132 A1 | 9/2003 | Lin et al. | |
| 2004/0181695 A1 | 9/2004 | Walker | |
| 2004/0209655 A1 | 10/2004 | Kubo | |
| 2004/0235514 A1 | 11/2004 | Bloch et al. | |
| 2004/0255000 A1 | 12/2004 | Simionescu et al. | |
| 2005/0004925 A1* | 1/2005 | Stahl et al. | 707/100 |
| 2005/0012591 A1 | 1/2005 | Tomljenovic et al. | |
| 2005/0138399 A1 | 6/2005 | Cheston et al. | |
| 2005/0144284 A1* | 6/2005 | Ludwig et al. | 709/226 |
| 2005/0148329 A1 | 7/2005 | Brunet et al. | |
| 2005/0149564 A1 | 7/2005 | Jain et al. | |
| 2005/0221800 A1 | 10/2005 | Jackson et al. | |

(Continued)

FOREIGN PATENT DOCUMENTS

JP 11-308271 11/1999

(Continued)

OTHER PUBLICATIONS

Japanese Patent Application No. 2005-318505, Notice of Reasons or Rejection, mailed Oct. 20, 2009. (English Translation).

(Continued)

*Primary Examiner* — Benjamin Lanier
(74) *Attorney, Agent, or Firm* — Blakely, Sokoloff, Taylor & Zafman LLP

(57) ABSTRACT

According to one embodiment of the invention, a method comprises receiving a write request for a file. A temporary file associated with the file is created in response to the write request. A write-lock is applied to the temporary file, namely the file includes a setting that restricts write access to only a component that created or opens the temporary file. Thereafter, the temporary file is closed to disable the write-lock and to enable a component that initiated the write request to access the temporary file.

16 Claims, 8 Drawing Sheets

U.S. PATENT DOCUMENTS

| | | |
|---|---|---|
| 2006/0013367 A1 | 1/2006 | Sawyer et al. |
| 2006/0166659 A1 | 7/2006 | Wiese et al. |
| 2006/0199534 A1 | 9/2006 | Smith |
| 2007/0101407 A1 | 5/2007 | Cheung et al. |
| 2007/0266027 A1* | 11/2007 | Gattegno et al. .......... 707/8 |
| 2008/0004039 A1 | 1/2008 | Ober et al. |
| 2008/0005783 A1 | 1/2008 | Polzin et al. |
| 2008/0120423 A1 | 5/2008 | Hall |
| 2008/0120716 A1 | 5/2008 | Hall |
| 2008/0120727 A1 | 5/2008 | Lee |
| 2009/0013055 A1 | 1/2009 | Hall, Jr. et al. |
| 2009/0260088 A1 | 10/2009 | Quach |

FOREIGN PATENT DOCUMENTS

| | | |
|---|---|---|
| JP | 2001-256041 | 9/2001 |
| JP | 2003501893 | 1/2003 |
| JP | 2005-229464 | 8/2005 |

OTHER PUBLICATIONS

U.S. Appl. No. 11/825,048, Non-final Office Action mailed Aug. 11, 2009.

U.S. Appl. No. 11/825,048, Final Rejection mailed Feb. 22, 2010.

U.S. Appl. No. 11/821,245 Final Rejection Action mailed Jan. 21, 2010.

U.S. Appl. No. 11/821,245 Non-Final Rejection Action mailed Jun. 10, 2009.

""California Software Labs, Realize your Ideas"", *SMS (Short Message Service)—Technical Overview*, 2002 CSWL Inc. vol 1, Pleasanton., (2002), 1-17.

* cited by examiner

SYSTEM AND METHOD OF PROTECTING FILES FROM UNAUTHORIZED MODIFICATION OR DELETION

CROSS-REFERENCE TO RELATED PATENTS

This application is based on and claims the benefit of priority on U.S. Provisional Application No. 60/860,578 filed Nov. 21, 2006, the entire contents of which are incorporated herein by reference.

FIELD

Embodiments of the invention generally relate to a system and method for protecting files, such as dynamic configuration files, from unauthorized modification or deletion.

This application is based on and claims the benefit of priority on U.S. Provisional Application No. 60/860,578 filed Nov. 21, 2006, the entire contents of which are incorporated herein by reference.

GENERAL BACKGROUND

Frequently, software configuration files are not protected by system software, but when protected, such protection is accomplished by conventional means. While conventional file protection systems are suitable for protecting static configuration files from unauthorized modification during a computing session, such systems are ineffective in protecting dynamic configuration files that are likely to be modified during a computing session.

More specifically, conventional file protection systems are configured to respond to unauthorized modification of software configuration files by simply replacing the modified file with an original version of that file. Hence, this replacement technique clearly is problematic for software configuration files that dynamically change during a computing session since these configuration files will likely differ significantly from their originally stored state.

BRIEF DESCRIPTION OF THE DRAWINGS

Features and advantages of embodiments of the invention will become apparent from the following detailed description in which.

DETAILED DESCRIPTION

Embodiments of the invention set forth in the following detailed description generally relate to a system, software and method for protecting dynamic files within a computing device from unauthorized modification or deletion. Herein, a file is considered to be "dynamic" when its content may be altered. Examples of dynamic files include certain configuration files, database files as well as data files that may be modified by their associated programs. The protection of these dynamic files is accomplished by limiting access to programs that have access to these files and establishing protected read and write data operations made available to authorized programs.

In general, an embodiment of the invention solves the problem of guaranteeing that a change in the contents of a file, persistently stored on machine-readable medium and dynamic in nature, is made by a recognized program or group of programs. In other words, the data is properly synchronized among the programs, regardless of whether or not the involved programs are running simultaneously or in communication with each other.

In the following description, certain terminology is used to describe various features of one or more embodiments of the invention. For instance, a "computing device" is generally defined as any electronic device including, but not limited or restricted to a computer (e.g., desktop, laptop, tablet, handheld, server, etc.), a router, a personal digital assistant (PDA), a cellular telephone, an alphanumeric pager, a personal video recorder (PVR), a music player (e.g., compact disc "CD" player or portable digital music player), Digital Versatile Disc (DVD) player, or the like.

In general, a "component" includes any hardware, software, firmware or any combination thereof. A "file" is a collection of data or information assigned an identifier such as a filename, file path or even a registry key path. Examples of various files include, but are not limited to data files, configuration files, directory files, database files such as the registry, and the like.

The terms "program" or "agent" generally refer to one or more instructions that perform a particular function or functions. These instructions may be stored within machine-readable medium such as firmware or software. "Machine-readable medium" is any medium that can at least temporarily store information including, but not limited or restricted to the following: an electronic circuit, a semiconductor memory device (non-volatile or volatile), a hard disk drive, and various types of portable storage devices (e.g., flash drive, compact disc "CD", digital versatile disk "DVD", etc.).

It is contemplated that both programs and agents may operate as foreground processes or background processes, where agents may operate as a background process more likely than other types of programs.

Figure 1:
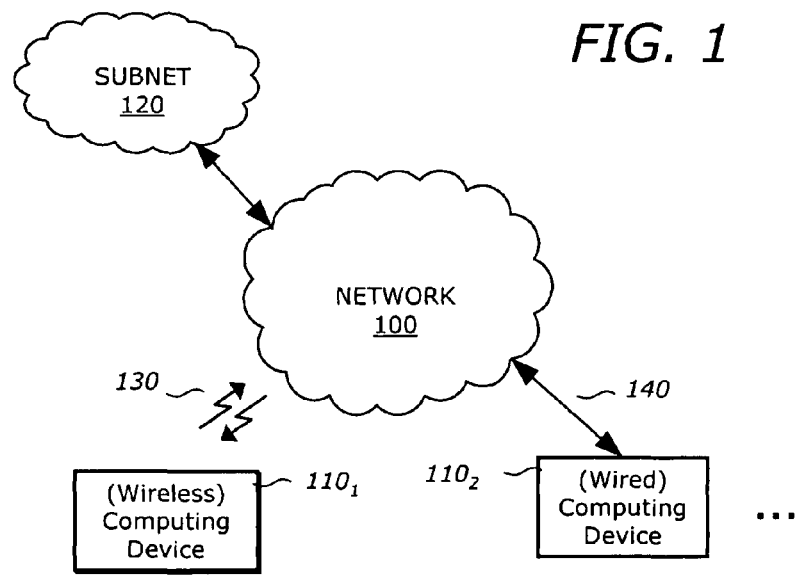
FIG. 1 is an exemplary embodiment of a network utilizing an embodiment of the invention.

Referring to FIG. 1, an illustrative embodiment of a network 100 implemented with an embodiment of the invention is shown. Network 100 is a public network that provides connectivity between two or more computing devices $110_1$ and $110_2$. Examples of a "public network" include a wide area network such as the Internet and/or carrier's cellular network.

Of course, it is contemplated that network 100 may be a private network (e.g., local area network), or a combination of private and public networks.

As shown, for this illustrative embodiment, computing device $110_1$ is a wireless electronic device that is capable of establishing wireless communications with network 100 through a wireless interconnect 130. These wireless communications, namely the exchange of electromagnetic waves that carry information such as radio-frequency (RF) signals or cellular signals for example, enable computing device $110_1$ to communicate with another computing device $110_2$ (e.g., desktop computer) that is connected to network 100 over a wired interconnect 140 or with another computing device on a remotely located subnet 120.

Figure 2:
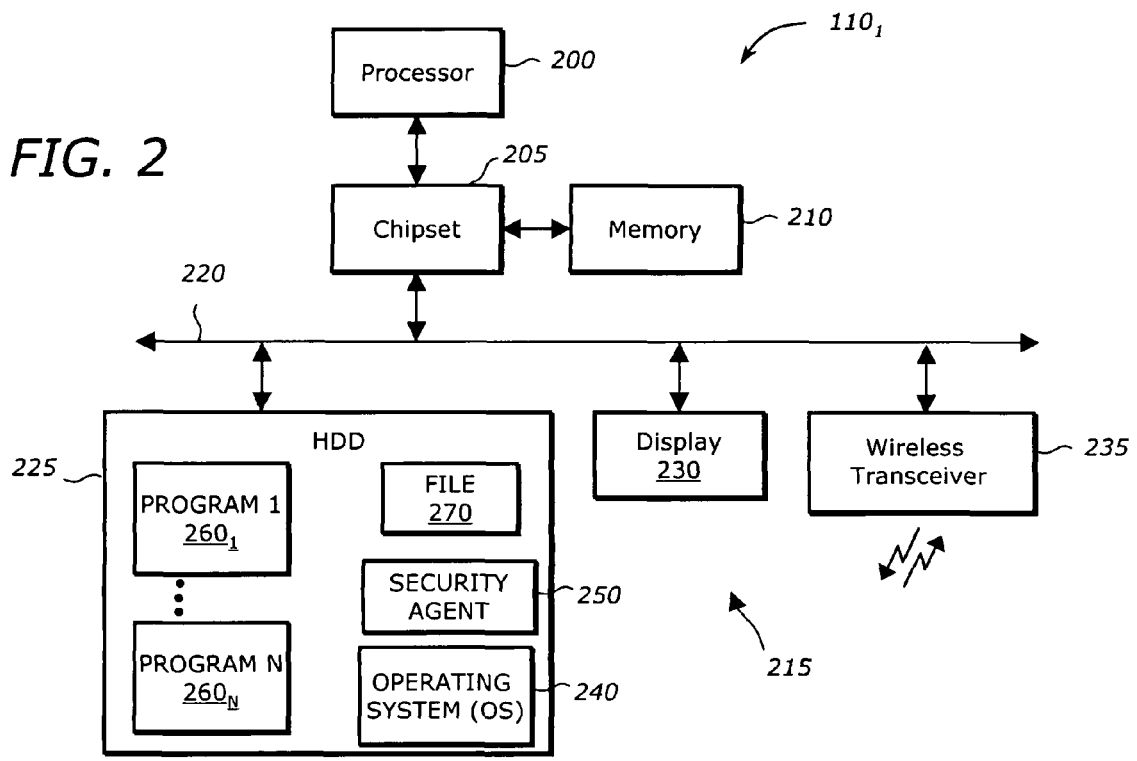
FIG. 2 is an exemplary embodiment of a block diagram of the internal architecture of a computing device of FIG. 1 implemented with a Security Agent that is designed to enable file protection of dynamic files.

Referring now to FIG. 2, an exemplary embodiment of internal architecture of computing device $110_1$ is shown. Herein, as described below, computing device $110_1$ is implemented with a Security Agent 250 that protects both static and dynamic files stored within computing device $110_1$ from unauthorized modification or deletion.

According to one embodiment of the invention, computing device $110_1$ comprises a processor 200 coupled to a chipset 205. Chipset 205 controls the flow of information between processor 200, a main memory 210 and a plurality of input/output (I/O) devices 215 each coupled to an internal bus 220. According to one embodiment of the invention, the plurality of I/O devices 215 include, but are not limited or restricted to a hard disk drive (HDD) 225, a display 230, and a wireless transceiver 235.

As shown, hard disk drive 225 stores Security Agent 250, which may be implemented as a series of instructions such as hard-coded instructions (e.g., code instructions that are stored in persistent storage and may or may not be alterable). According to one embodiment of the invention, the instructions may be adapted to run as a Windows® Service and is launched during booting of computing device $110_1$. Such an implementation would mitigate the likelihood of unauthorized termination of Security Agent 250. Moreover, content of Security Agent 250 may be protected from physical attack (e.g., deletion of name, content alternation, etc.) by limiting access to Security Agent 250 based on settings within an access control list (ACL) used by the operating system (OS) 240 of computing device $110_1$. Moreover, content of Security Agent 250 may be protected from physical attack (e.g., deletion of name, content alternation, etc.) by two or more instances of Security Agent 250 such that all instances protect each other. Alternatively, according to another embodiment of the invention, Security Agent 250 may be configured as a software driver.

Hard disk drive 225 further stores one or more programs $260_1$-$260_n$ (N≧1) that are in communication with Security Agent 250. Some of these programs are adapted to process data and perform read and write operations on one or more files 270 also stored on hard disk drive 225.

According to one embodiment of the invention, Security Agent 250 is preloaded on hard disk drive 225, although Security Agent 250 could be loaded onto hard disk drive 225 from a separate source (e.g., downloaded from a remotely located server on subnet 120 of FIG. 1 or uploaded from a portable storage device such as a CD, DVD, flash drive, flash memory, or the like).

Figure 3:
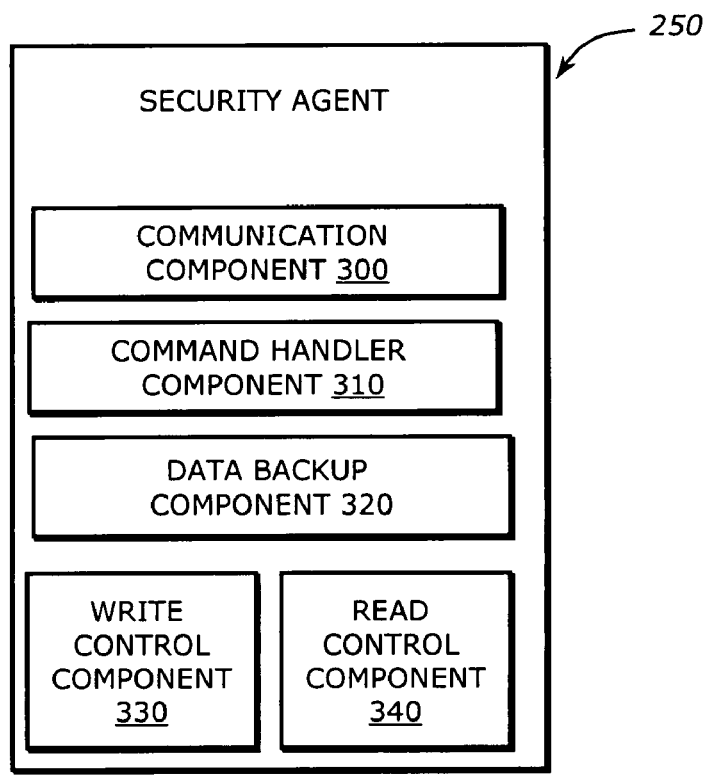
FIG. 3 is an exemplary embodiment of a block diagram of the Security Agent of FIG. 2.

Referring to FIG. 3, according to one embodiment of the invention, Security Agent 250 comprises a communication component 300, a command handler component 310, a data backup component 320, a write control component 330 and a read control component 340. These components 300-340 collectively operate to protect all types of files, including dynamic files, from unauthorized modification or deletion.

According to one embodiment of the invention, communication component 300 is adapted to control communications with and receive file operation commands from one or more programs. A "file operation command" is generally an instruction that is arranged in a predetermined format and is transmitted over a logical pathway in order to create a file or control operations on a file. Examples of file operation commands include, but are not limited or restricted to a Create command, an Open command, a Close command, or the like.

In general, a "Create" command is a command that operates as a request to create a new file. In accordance with an embodiment of the invention, the Create command features access and file sharing parameters that may be set to impose access restrictions on the newly created file. For instance, in accordance with one embodiment of the invention, write access to a newly created file may be restricted to only the component initiating the Create command with restricted or unrestricted read access as well.

The "Open" command is a command that is used to open an existing file. Similar to the Create command, access parameters may be provided as part of the Open command to restrict access to the existing file when opened and its contents accessible.

The "Close" command is a command that is used to terminate access to an active file by a component. The Close command also removes those access restrictions on the file that were imposed by the component using the corresponding Create or Open command. Removing the restrictions may allow other programs access to the file.

As further shown in FIG. 3, command handler component 310 is responsible for parsing the received commands and returning a status of operation message that includes a "result" value. This message identifies whether the command was processed correctly (Result=Success, where "Success" denotes a first logical value such as "1") or was processed incorrectly (Result=Fail, where "Fail" denotes a second logical value such as "0"). Any failures in processing a command may initiate an error handling mechanism to determine how the processing error should be handled (e.g., retry the command, user notification, reboot the computing device, etc.). Depending on the command received, the command handler component 310 is also responsible for returning a "token" and other values to a component to use as parameters in other commands.

Data Backup component 320 is responsible for saving, monitoring, and restoring the most recent file (e.g., software file, registry setting, etc.). Such storage may be locally within the computing device or remotely on an external storage device.

Write control component 330 is responsible for performing a write operation. In particular, write control component 330 initiates Write requests in order to transfer data to a targeted file. Read control component 340, on the other hand, initiates Read requests in order to obtain data from a targeted file. As will become apparent from the following, the write control component and read control component also perform create, open, and close operations as part of their main responsibility.

Figure 4:
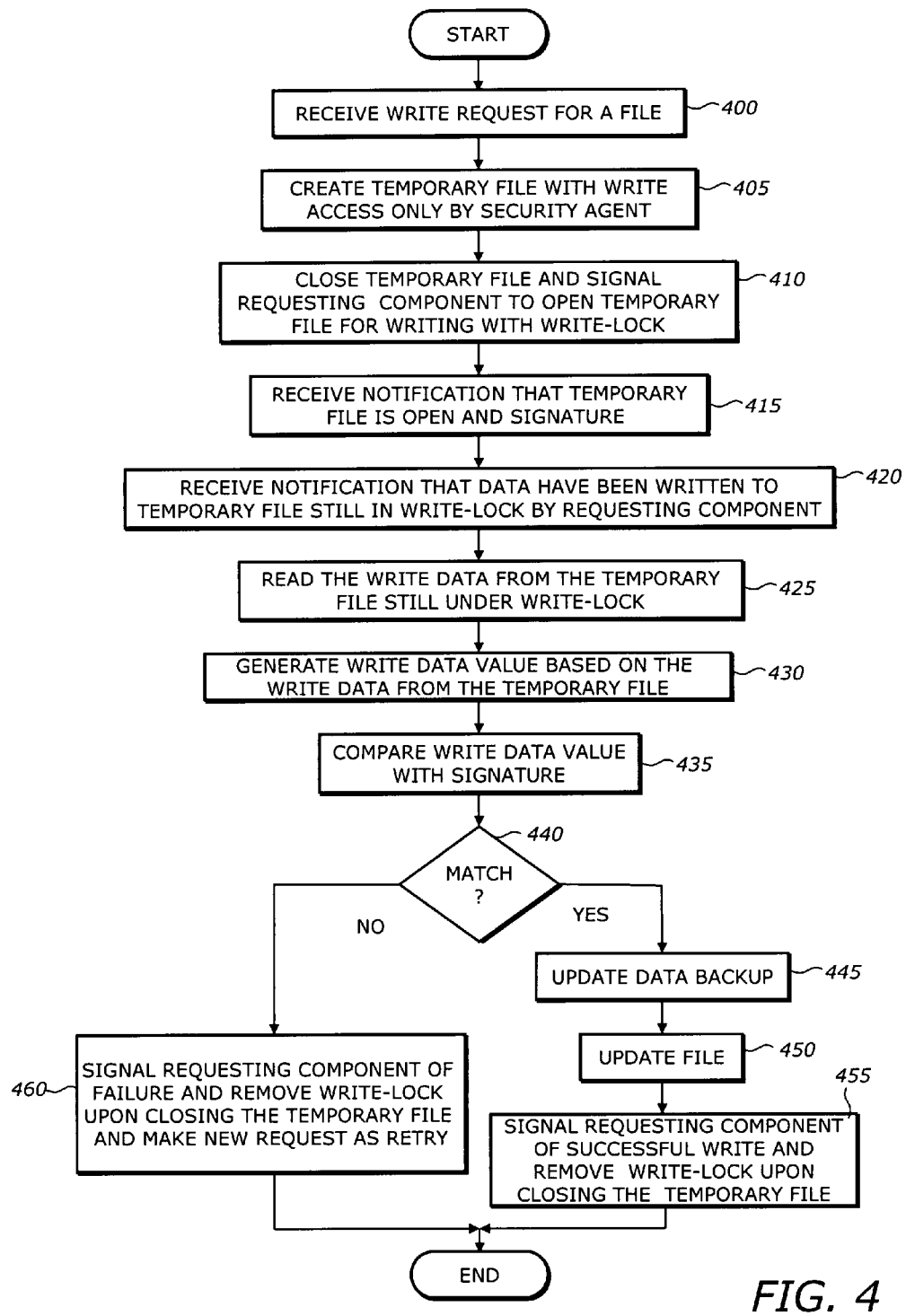
FIG. 4 is an exemplary flowchart outlining operations performed by the Security Agent of FIG. 3 during a Write operation.

Referring now to FIG. 4, an exemplary flowchart outlining operations performed by Security Agent 250 of FIG. 3 during a Write operation is shown. The operations of the Security Agent describe a scheme to protect files, including dynamic files, from unauthorized modification or deletion.

According to this embodiment of the invention, the Security Agent operates as an intermediary between certain signaling exchanged between a component (e.g., program $260_1$ of FIG. 2) and OS 240 of FIG. 2. For this embodiment, the Security Agent receives a Write request for a file from the component in lieu of the Write request being routed directly to the OS (block 400). Upon receiving the Write request, the Security Agent creates a temporary file associated with the file (block 405). This temporary file is created with desired access and file-sharing settings. According to one embodiment of the invention, a "write-lock" is placed on the temporary file, namely the settings are configured to restrict write access to only the component that created (or opened) the file. For instance, for this operation, the write-lock allows the Security Agent write access to the temporary file, but precludes file-sharing (write or read access) by all other components. If the Security Agent cannot create a temporary file with the properties as stated, the Security Agent will notify the component that the Write request cannot be fulfilled. The component that initiated the Write request would handle the failure as an error and conduct appropriate error handling. The purpose of creating the temporary file is to verify that the file can be created. Once the file is closed by the Security Agent, the file cannot be protected from being written to by another rogue application. Later, when program $260_1$ reopens the temporary file, it will impose the write lock settings.

After being created, the temporary file is closed and the component that initiated the Write request (hereinafter referred to as the "requesting component") is notified that it can open the temporary file for writing purposes (block 410). The closing of the temporary file removes the write-lock so that the requesting component now can have access to the temporary file.

Thereafter, as illustrated in block 415, the Security Agent receives notification when the temporary file is opened by the program (with a new write-lock initiated) and further receives authentication data (also referred to as a "signature") associated with the data to be written into the temporary file (hereinafter referred to as the "write data"). At a minimum, the "signature" includes data for verifying the write data (e.g., a hash value of the write data, a cyclic redundancy check "CRC" value, checksum, etc.), and optionally, may include a description of the verification method(s) used for verifying the write data.

In addition, the Security Agent receives notification that the write data has been written to the temporary file that is currently under write-lock by the requesting component (e.g., program $260_1$) (block 420). As part of this notification, the Security Agent may optionally receive an updated signature, to account for unforeseen changes to the write data (e.g., an error code instead of actual value has to be written). As shown in blocks 425 and 430, once the write data has been written to the temporary file, the Security Agent reads the write data from the temporary file and generates information used to authenticate the write data (hereinafter referred to as the "write data value").

The write data value is compared to the signature received from the program (blocks 435 and 440). If a match is detected, the Security Agent updates both a storage location for this file that is controlled by backup component of the Security Agent and the actual file with contents from the temporary file (blocks 445 and 450). Thereafter, the requesting component is notified of the successful write operation and the file is closed, which causes the write-lock to be removed (block 455).

However, if there is no match between the write data value and the signature, the Security Agent notifies the requesting component of an unsuccessful write operation. This notification results in the program closing the temporary file (thereby removing the write-lock) and optionally initiating a new Write request for the file (block 460).

Of course, it is contemplated that instead of using a temporary file in the Write request, the Security Agent can return the name of the actual file to the program, provided the file is tested to be accessible using the desired access and file-sharing settings prior to this return operation illustrated in block 410. The remaining operations set forth in blocks 415-445 and 460 will generally be performed by the Security Agent, except for the updating of the actual file set forth in block 450.

Figure 5A:
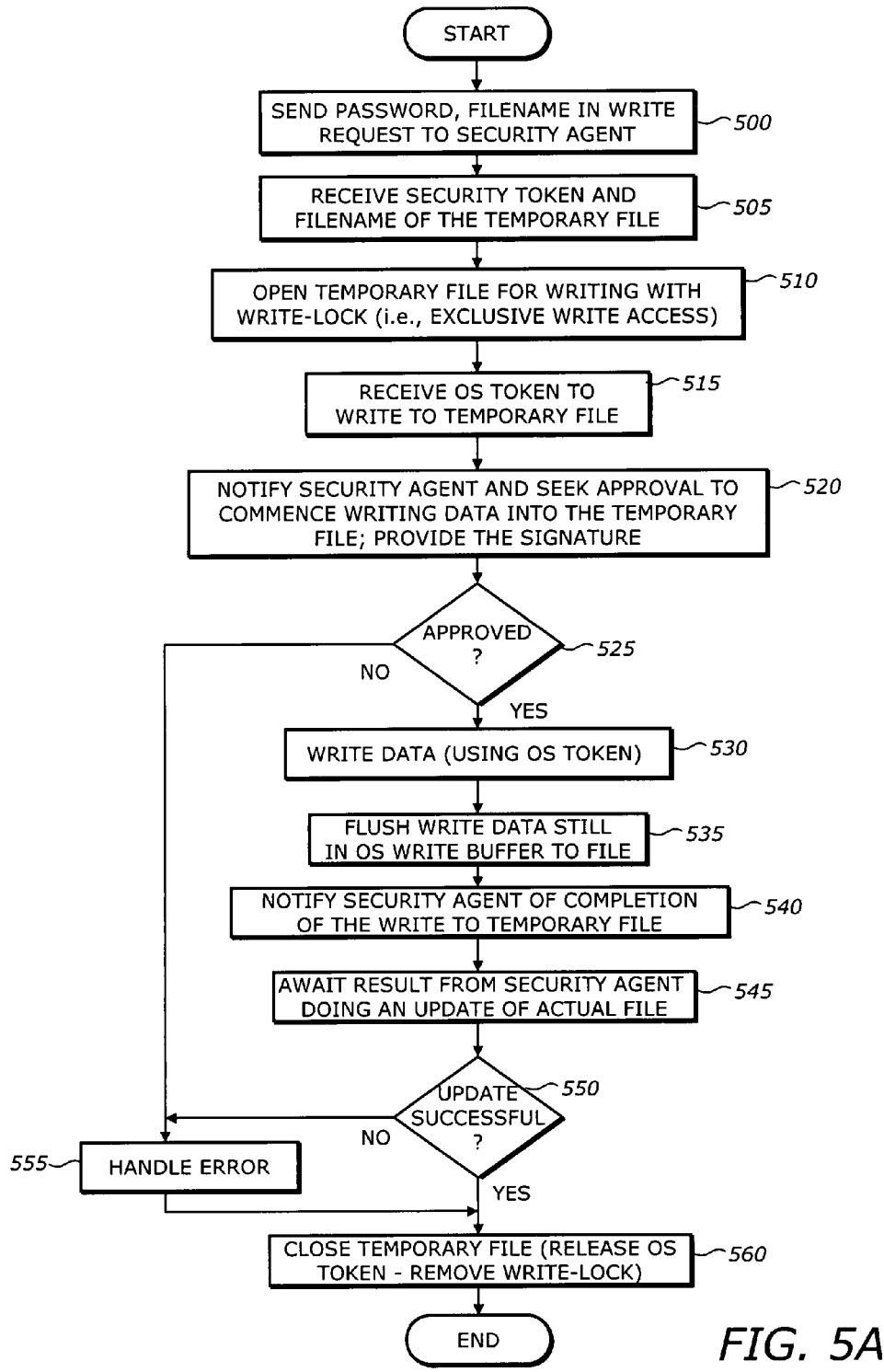
FIG. 5A is an exemplary flowchart outlining operations performed by the program of FIG. 3 during a Write operation.

Referring now to FIG. 5A, an exemplary flowchart outlining operations performed by a component (e.g., program $260_1$) of FIG. 3 during a Write operation is shown. According to one embodiment of the invention, a Write request including both a password and an identifier of a file to be written is provided to the Security Agent (block 500). In response, as shown in block 505, the program receives an abstract file handle associated with Security Agent (hereinafter referred to as a "security token") and information for locating the temporary file for writing purposes (hereinafter referred to as "pathname").

According to one embodiment of the invention, the "security token" is an identifier to locate information such as the name of the file, the name of the temporary file, for use in the write operation and subsequent functions to be performed by the Security Agent and the like. One example of such information is an object-oriented-class object that allocates information associated with the Write request (e.g., names of the file and temporary file, signature, etc.) and related functions such as the Notify Start and the Notify Finish functions described below.

According to another embodiment of the invention, for enhanced security in the case that there is not a continuous and secure communication session between program $260_1$ and Security Agent 250 of FIG. 2A, each command from the program $260_1$ to the Security Agent 250 may include a password.

Upon receipt of the security token, the program calls the Open function of the OS to open the temporary file for writing purposes (block 510). Access to the temporary file is limited through a write-lock, which restricts write access of the temporary file, with the program having exclusive write access to the temporary file.

Thereafter, the program receives an abstract file handle associated with OS (hereinafter referred to as the "OS token"). The OS token may be used for later writing to the temporary file (block 515) using OS-based commands until a Close command is performed using the OS token.

Thereafter, the program notifies the Security Agent of its intent to start writing data to the temporary file and provides a signature (block 520). The signature is subsequently used to verify and signal to the program whether or not the write operation has been performed without error (i.e., result=Success). Before saving the signature and granting approval to commence writing, the Security Agent checks for any on-going operations on the file, checks that the temporary file opened by the program has the correct access restriction imposed, and checks that the format of the signature is supported.

Upon receiving approval from the Security Agent to commence the write operation, the program transmits one or more write messages to the OS, which include (i) the OS token to locate the temporary file and its parameters and (ii) the write data (blocks 525 and 530). As an optional operation, a flush command may be sent to the OS to ensure that any write data still in the OS write buffer is written into the temporary file (block 535).

After completion of the write operation, the program notifies the Security Agent that the write operation has completed (block 540). Thereafter, as shown in blocks 545 and 550, the program waits for a result from the Security Agent indicating whether or not the update operation has been performed without error (i.e., was successful). Upon receiving a message that the write operation was not successful, the program initiates an error handling mechanism to close the file (block 560) and possibly retry the write operation (block 555). However, if the write operation was successful, the temporary file is closed (block 560). The closure of the temporary file releases the OS token and permits access to the file by other programs.

Figure 5B:
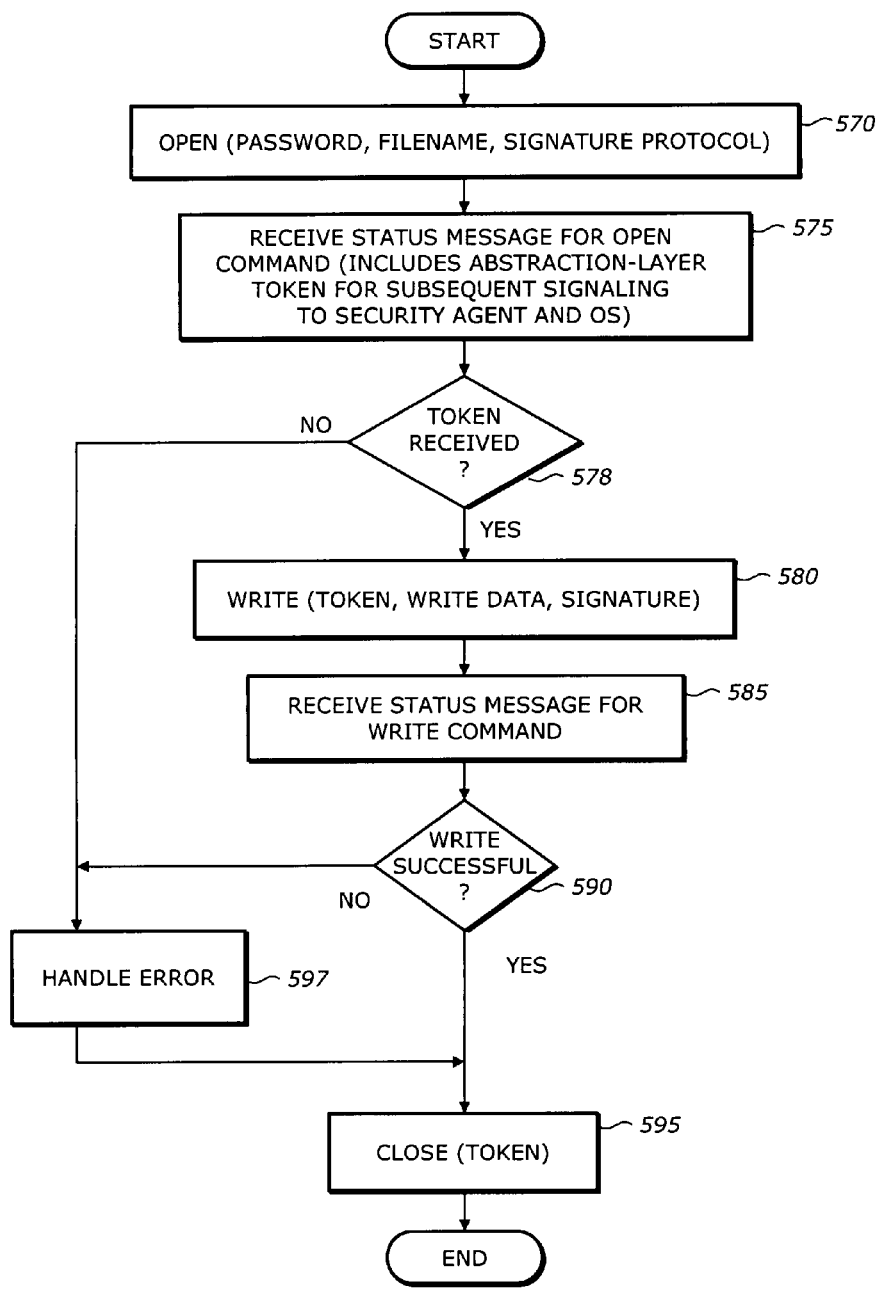
FIG. 5B is an exemplary flowchart of the operations performed by a component where the Security Agent of FIG. 3 contains abstraction layer functionality.

Referring now to FIG. 5B, an exemplary flowchart of operations performed by a component where Security Agent 250 of FIG. 3 contains abstraction layer functionality is shown. The abstraction layer allows the component to make requests to the Security Agent using commands and command parameters similar to standard OS commands. The abstraction layer also allows the component to receive results from the Security Agent similar to standard OS command results. Thus, for the write operation described in FIG. 5A, the component (e.g., program $260_1$ of FIG. 3) will use the Open, Write and Close commands with parameters as shown below.

Each file operation command in FIG. 5B causes a corresponding abstraction layer function to perform one or more tasks previously described in FIG. 5A. For instance, according to one embodiment of the invention, an Open command is provided to the Security Agent (block 570). The "Open" command includes a filename of the file to be altered (i.e., an identifier of the file to be written), a password and information identifying the signature protocol that will be used by the Security Agent to authenticate the write data. In essence, the Open command causes the operations set associated with blocks 500, 510 and 520 of FIG. 5A to be performed.

In response to initiating the Open command, as shown in block 575, the program receives an abstraction-layer token, serving the purpose of the security token and the OS token. Upon receiving the abstraction-layer token, the program issues a Write command to the OS (blocks 578 and 580). The "Write" command includes a plurality of parameters including the abstraction-layer token, the write data and signature as described above. In essence, the Write command performs the writing of the write data into the temporary file, which may be followed by a flush command in order to write any remaining write data in the OS write buffer into the temporary file as described in blocks 530 and 535 of FIG. 5A.

Thereafter, a status message concerning the Write command is received (block 585). The result contained in the status message identifies whether the Write command has been completed and whether the Security Agent has confirmed that the write operation is successful (result=Success) or has failed (result=Fail). This success or failure in operation is determined by comparing the write data value with the signature as described in blocks 540, 545 and 550 of FIG. 5A.

If the result indicated successful completion of the Write command, the temporary file is closed (blocks 590 and 595). Otherwise, error handling is conducted prior to closing the temporary file. Error handling may include a retry of the Write request (blocks 590, 595 and 597).

Figure 6:
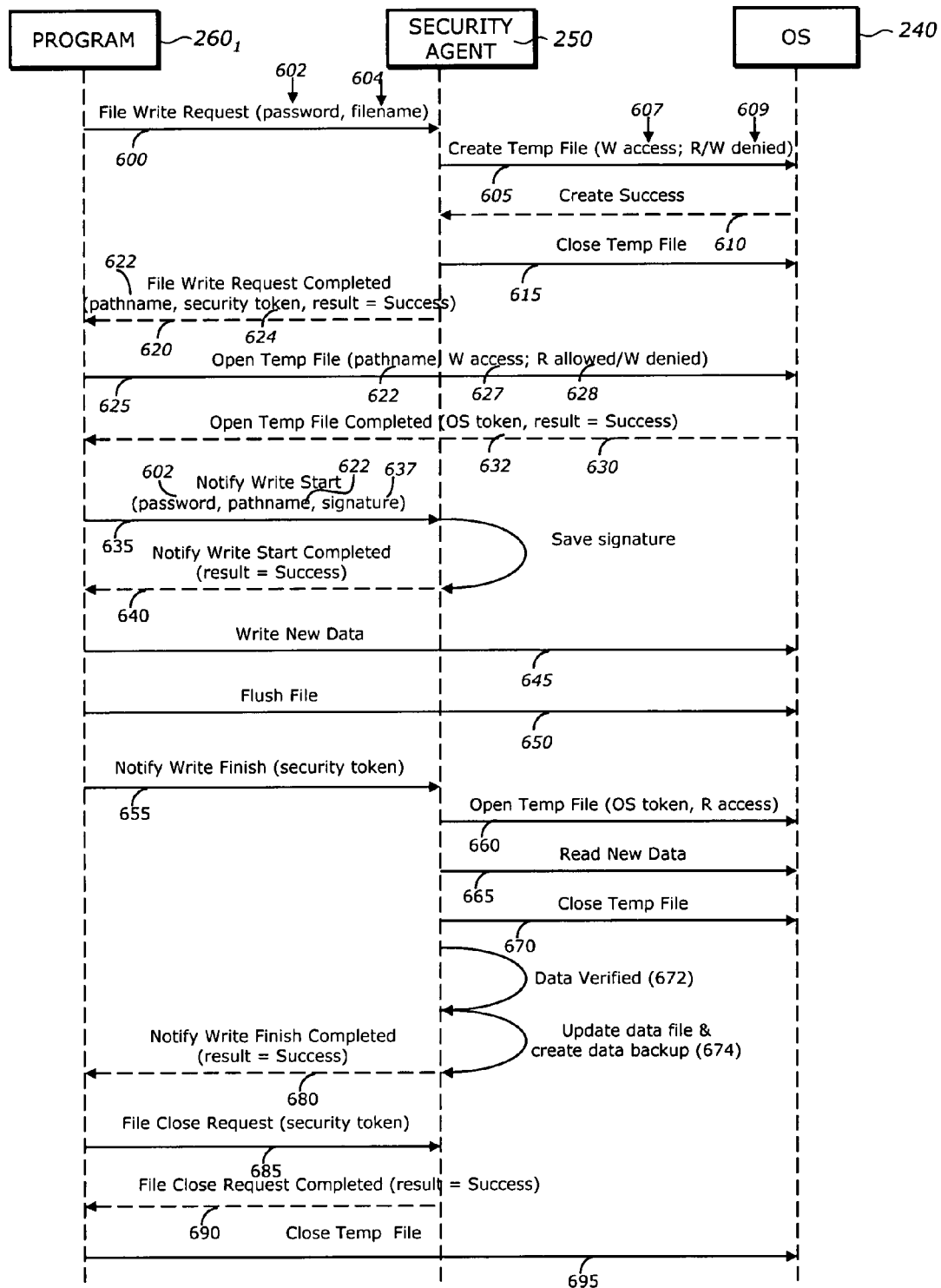
FIG. 6 is an exemplary embodiment of a signaling exchange between a program requesting to conduct a Write operation, the Security Agent and the Operating System implemented within the computing device.

FIG. 6 is an exemplary embodiment of the signaling exchange between a component (e.g., program $260_1$) requesting a write operation to be performed on a file, Security Agent 250 and Operating System (OS) 240 implemented within the computing device.

According to this embodiment of the invention, a File Write Request command 600 is sent from a program $260_1$ to Security Agent 250. File Write Request command 600 includes a password 602 and a filename 604. Password 602 is information that can be used by Security Agent 250 to confirm that subsequent commands from program $260_1$ are in fact from program $260_1$. Password 602 may be provided in a variety of formats and structures, such as a password string, a CRC value, an object with encrypted text and/or decryption key, or the like. Filename 604 identifies a name of the file to be altered.

Upon receipt of File Write Request command 600, Security Agent 250 sends a Create Temp File command 605 to notify and request permission from OS 240 to create a temporary file associated with the file. According to one embodiment of the invention, Create Temp File command 605 includes an access parameter 607 and a file-sharing parameter 609. Herein, for this illustrative embodiment, access parameter 607 is set to get write access for Security Agent 250 while file-sharing parameter 609 is set to deny write access (and optionally deny read access) of the temporary file by any other program. These settings impose a "write-lock," namely a condition where the write access is restricted only to the component, namely Security Agent 250 in this illustrative example, that created (or opened) the temporary file.

Thereafter, OS 240 returns a Create Success command 610 to Security Agent 250. Create Success command 610 signals that Security Agent 250 is permitted to create the temporary file. After creation of the temporary file, Security Agent 250 issues a Close Temp File command 615 to OS 240, which closes the temporary file and removes the write-lock.

Based on these operations, Security Agent 250 creates an object-oriented-class object including filename 604, a pathname for the temporary file, and File Write Request command 600. The object will also allocate space for the signature as well as enable functions such as Notify Write Start and Notify Write Finish as described below.

In addition, Security Agent 250 sends a File Write Request Complete response 620 to program $260_1$ in order to signal that File Write Request command 600 has been successfully completed (Result=Success) and provide other information to program $260_1$ that will be used to locate and open the temporary file. The information includes a pathname 622 (e.g., the file path of the temporary file) and security token 624 that references the object-oriented-class object maintained by Security Agent.

Next, component (e.g., program $260_1$) issues an Open Temp File response 625 that signals OS 240 to open the temporary file for writing purposes. Open File command 625 includes a plurality of parameters, including pathname 622, access properties 627 and file-sharing properties 628. As provided by Security Agent 250, pathname 622 is used to identify the temporary file. Access properties 627 are set to get write access to the temporary file. File-sharing properties 628 are set so that all other programs have read access to the temporary file and no other programs have write access.

Thereafter, OS 240 returns a status message, namely an Open Temp File Complete message 630 with a "Success" result, if the temporary file has been opened with requested access and file-sharing properties. Open Temp File Complete message 630 also includes OS token 632 for subsequent use in communications with the OS. Otherwise, the Temp File Complete message 630 would be returned with a "Fail" result to indicate that the temporary file could not be opened. This may require a new File Write Request command to be initiated. Through the exchange of command 625 and message 630, program 260₁ receives notification that the temporary file is opened.

According to one embodiment of the invention, a signature is provided from program 260₁ to Security Agent 250 for subsequent use in write protection. This may be accomplished by program 260₁ sending a Notify Write Start command 635 to Security Agent 250. Notify Write Start command 635 comprises password 602 (or alternately the security token 624), pathname 622 and a signature 637, which is data used for authentication of the write data.

Upon confirmation of password 602, thereby confirming that command 635 originated from program 260₁, signature 637 is stored as part of the object-oriented-class object associated with the temporary file. Security agent 250 returns a Notify Write Start Complete message 640 that provides a result identifying whether storage of signature 637 were successful (result=Success).

Upon confirmation that signature 637 has been saved within security agent 250, program 260₁ begins sending one or more write messages 645 to OS 240, where these message include (i) the OS token to locate the temporary file and its parameters, and (ii) the write data. After completion of write message(s) 645, a write flush command 650 may be sent to OS 240 to ensure that the write data present in the OS write buffer is written into the temporary file.

After completion of the write operation, the program sends a Notify Write Finish command 655 to Security Agent 250. Notify Write Finish command 655 includes signals to Security Agent 250 that the write operation has completed. Hence, the write data has been written to the temporary file, which is currently under write-lock by program 260₁. The program may optionally include an updated signature 637 in Notify Write Finish command 655 for the Security Agent.

Security Agent 250 initiates an Open Temp File command 660 and a Read New Data command 665 that enables Security Agent to read the write data from the temporary file still under write-lock by program 260₁. After reading the write data, Security Agent 250 issues a Close Temp File command 670 and generates the write data value.

In operation 672, the write data value is compared to stored signature 637. If a match is detected, the Security Agent updates both storage controlled by data backup and the file with contents of the temporary file as shown by arrow 674. Thereafter, Security Agent 250 notifies program 260₁ of the successful write operation via Notify Write Final Complete message 680.

Upon receiving Notify Write Final Complete message 680, program 260₁ is aware that the file has been updated, and as an optional feature, program 260₁ may initiate signaling 685 to notify Security Agent 250 that no further Write requests are targeted for file. Upon receipt of such signaling, Security Agent acknowledges receipt of the signaling 685 by a returned result message 690. Thereafter, the temporary file is closed via transmission of Close Temp File command 695 to OS 240.

It is contemplated that if an error occurs in the processing of any of the commands, the requesting component is notified of an unsuccessful result signal, and in response, an error handling mechanism would be responsible for handling the error and perhaps closing the actual or temporary file.

Figure 7:
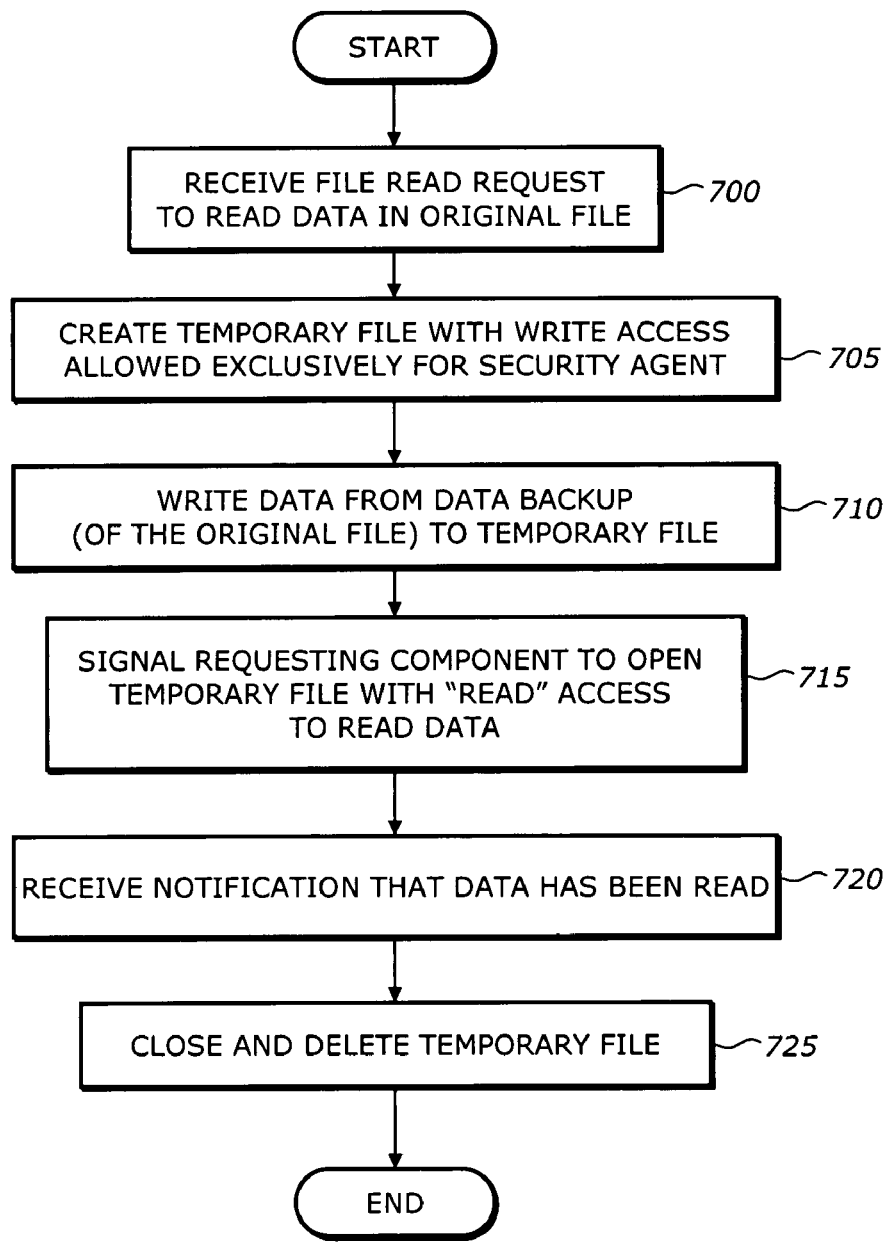
FIG. 7 is an exemplary flowchart outlining operations performed by the Security Agent of FIG. 3 during a Read operation.

Referring now to FIG. 7, an exemplary flowchart outlining operations performed by Security Agent 250 of FIG. 3 during a read operation is shown. According to this embodiment of the invention, operating as an intermediary between a component (e.g., program 260₁ of FIG. 3) and the OS, the Security Agent receives a Read request to read data in a file (block 700). Upon receiving the Read request, the Security Agent creates a temporary file associated with the file (block 705). This temporary file is created with a write-lock that provides write access exclusively to Security Agent and permits unrestricted read access.

After being created, data fetched from a storage location by data backup component of the Security Agent, where such data corresponds to data currently in the file, is written into the temporary file (block 710). Thereafter, the Security Agent advises the component initiating the Read request (hereinafter referred to as "requesting component") to open the temporary file with read access in order to read the write data stored in the temporary file (block 715). Once the data within the temporary file has been read, the Security Agent receives a notification (block 720). Thereafter, the temporary file is closed and deleted (block 725).

In another embodiment of the invention, when the Security Agent advises the requesting component to open the temporary file with read access to read the write data stored in the temporary file (block 715), the Security Agent provides the signature 637 as well. The requesting component can use the signature 637 to verify the write data that it reads from the temporary file.

Figure 8:
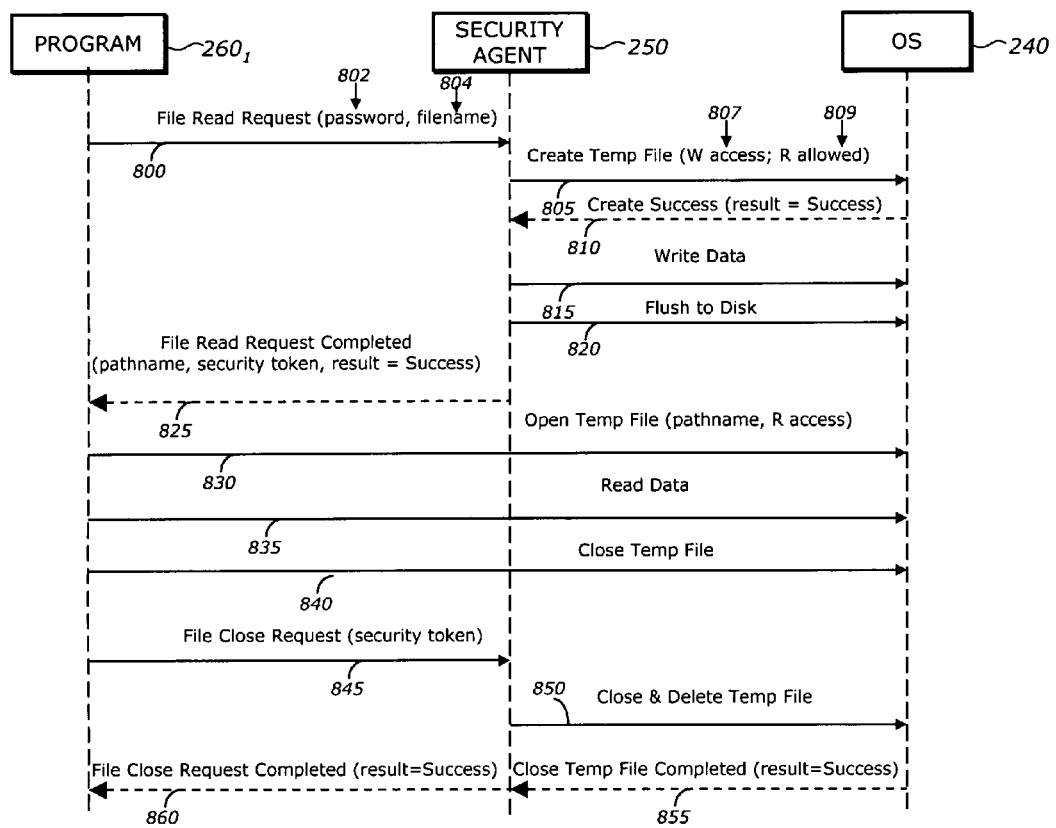
FIG. 8 is an exemplary embodiment of a signaling exchange between a program requesting to conduct a Read operation, the Security Agent and the Operating System implemented within the computing device.

Referring now to FIG. 8, an exemplary embodiment of the signaling exchange between a component (e.g., program 260₁) requesting a read operation to be performed on a file, Security Agent 250 and Operating System (OS) 240 implemented within the computing device is shown.

According to this embodiment of the invention, a File Read Request command 800 is sent from a program 260₁ to Security Agent 250. File Read Request command 800 includes a password 802 and a filename 804. Password 802 is information that can be used by Security Agent 250 to confirm that a subsequent command from program 260₁ did in fact originate from program 260₁. Filename 804 identifies a name of the file to be read.

Upon receipt of File Read Request command 800, Security Agent 250 sends a Create Temp File command 805 to notify and request permission from OS 240 to create a temporary file associated with the file (filename). According to one embodiment of the invention, Create Temp File command 805 includes an access parameter 807 and a file-sharing parameter 809. Herein, for this illustrative embodiment, access parameter 807 is set to get write access for Security Agent 250 while file-sharing parameter 809 is set to deny write (imposes a "write-lock" condition), but allow read-only access, of the temporary file by any program.

Thereafter, OS 240 returns a Create Success message 810 to Security Agent 250. Create Success message 810 is a status message that indicates whether Security Agent 250 is permitted to create the temporary file. After creation of the temporary file, Security Agent 250 issues one or more Write Data commands 815 to OS 240, which causes data corresponding to the file and stored by the data backup component to be written into the temporary file. In addition, a write flush command 820 may be sent to OS 240 to ensure that any remaining data present in the OS write buffer is written into the temporary file.

Thereafter, Security Agent 250 returns a File Read Request Completed response 825 to program 260₁. Upon returning File Read Request Completed response 825, program 260₁ is aware that File Read Request command 800 has successfully completed (result=Success) and is now aware of the location of the temporary file (pathname). This information advises program 260₁ to initiate a read operation by issuance of Open Temp File command 830 that identifies the temporary file (pathname) and that this file will be opened with read access. In another embodiment of the invention, this information may optionally include the signature 637 for the program to verify the write data after reading the data from the temporary file.

Thereafter, the data within the temporary file is read 835 and, after completing the read operation, access to the temporary file by program $260_1$ is ended when program $260_1$ issues a Close Temp File command 840. In addition, program $260_1$ issues a File Close Request command 845 to Security Agent 250 to advise Security Agent 250 that the requested data has been read.

In response to receiving File Close Request command 845, Security Agent 250 requests OS 240 to close and delete the temporary file as represented by arrow 850. Upon performance of these operations, OS 240 sends a Close Temp File Completed status message 855 to Security Agent 250, which issues a File Close Request status message 860 to program $260_1$ to indicate that the temporary file has been closed.

In the foregoing description, the invention is described with reference to specific exemplary embodiments thereof. It will, however, be evident that various modifications and changes may be made thereto without departing from the broader spirit and scope of the present invention. Therefore, the specification and drawings are accordingly to be regarded in an illustrative rather than in a restrictive sense.

What is claimed is:

1. A method comprising:
    receiving a write request for a file;
    creating a first version of a temporary file associated with the file in response to the write request in order to verify that the temporary file can be created, the first version of the temporary file having a setting to restrict write access to only a component that created the first version of the temporary file;
    closing the first version of the temporary file to enable a component that initiated the write request to access a second version of the temporary file;
    authenticating modifications to the second version of the temporary file after data has been written to the second version of temporary file by the component that initiated the write request; and
    concurrently updating the file and a backup file with data from the second version of temporary file.

2. The method of claim 1 further comprising receiving authentication data when the second version of the temporary file is opened by the component that initiated the write request.

3. The method of claim 2 further comprising receiving notification that data has been written to the second version of the temporary file.

4. The method of claim 3 further comprising:
    reading the data written to the second version of the temporary file;
    generating a write data value based on the data written to the second version of the temporary file; and
    comparing the write data value with the authentication data.

5. The method of claim 4 further comprising updating the file with the write data if a match is detected between the write data value and the authentication data.

6. The method of claim 5 further comprising
    sending a notification to the component that a successful write operation has been conducted;
    receiving signaling that no further write requests are targeted for the file; and
    closing the second version of the temporary file.

7. The method of claim 1 further comprising:
    receiving a read request for the file;
    creating a second temporary file with write access allowed exclusively for a security agent responsible for controlling secured access to data;
    writing data from a data backup component of the security agent to the second temporary file, the data backup component including the data that corresponds to data currently in the file; and
    opening the second temporary file with read access to read the data.

8. The method of claim 7 further comprising closing the second temporary file after the data has been read.

9. The method of claim 1, wherein the receiving of the write request includes receiving a command including a password and a filename, the password being information used to authentication origination of subsequent commands before creating the temporary file.

10. Software stored in a non-transitory machine-readable medium of a computing device and, when executed, protect both static and dynamic files stored within the computing device from unauthorized modification or deletion, the software comprising:
    a communication component adapted to control communications with and receive a Write command associated with a file from a program; and
    a security agent operating as an intermediary between the program and an operating system of the computing device, the security agent to receive the Write command, to create a first version of a temporary file associated with the file, the first temporary file is created with file-sharing settings that restrict write access of the first temporary file by only the security agent, to close the first version of the temporary file to enable access to a second version of the temporary file, to authenticate modifications to the second version of the temporary file after data has been written to the second version of the temporary file in response to the Write command, and to concurrently update the file and a backup file with data written to the second version of the temporary file.

11. The software of claim 10 wherein the security agent creates the first temporary file that also precludes a write or read access to the first temporary file by any component other than the security agent.

12. The software of claim 10 wherein the security agent to notify the program that the Write command cannot be fulfilled if the security agent cannot create the first temporary file.

13. The software of claim 10 wherein the security agent to receive a Read command and to initiate an operation to create a second temporary file to obtain data written to the first temporary file during the Write command.

14. The software of claim 10 further comprising a command handler component to parse the Write command and return a status of operation message that includes a result value to identify whether the Write command was processed correctly.

15. A computing device, comprising:
    a processor;
    a hard disk drive to store an operating system; and
    a security agent stored within the hard disk drive, the security agent operating as an intermediary between a component of the computing device and the operating system, the security agent to create and use temporary files associated with a file to be modified in order to protect the file from unauthorized modification or deletion, the security agent to (i) create a first version of a temporary file in response to a Write command from the component of the computing device, the first temporary file having a setting to restrict write access to only a component that created or opens the first version of the temporary file, (ii) closing the first version of the temporary file to enable the component to access a second version of the temporary file, and (iii) authenticate modifications of the second version of the temporary file after data has been written to the second version of the temporary file by the component of the computing device; and concurrently updating the file and a backup file with the data from the second version of the temporary file.

16. The computing device of claim 15 wherein the security agent to create a second temporary file in response to a Read command from the component, the second temporary file having a setting to deny write access and allow read access of the second temporary file by a plurality of components within the computing device including the component.

* * * * *